United States Patent [19]
Lemieux

[11] Patent Number: 6,071,091
[45] Date of Patent: Jun. 6, 2000

[54] INTEGRAL MOTOR/GENERATOR AND PUMP/TURBINE WITH HYDROSTATIC BEARINGS

[76] Inventor: Guy B. Lemieux, 200 - 2560 Simpson Road, Richmond, British Columbia, Canada, V6X 2P9

[21] Appl. No.: 09/022,960

[22] Filed: Feb. 12, 1998

[51] Int. Cl.$^7$ .................................................. F04B 17/00
[52] U.S. Cl. ................................ 417/423.1; 417/423.12; 417/424.1
[58] Field of Search ................................ 417/423.1, 356, 417/365, 423.5, 423.12, 424.1; 384/115, 119; 415/199.5

[56] References Cited

U.S. PATENT DOCUMENTS

| | | | |
|---|---|---|---|
| 3,218,981 | 11/1965 | Kierulf | 103/87 |
| 3,934,947 | 1/1976 | Walter et al. | 308/9 |
| 4,919,549 | 4/1990 | Lawson et al. | 384/113 |
| 5,209,650 | 5/1993 | Lemieux | 417/356 |

FOREIGN PATENT DOCUMENTS

| | | | |
|---|---|---|---|
| 0121053 | 10/1984 | European Pat. Off. . | |
| 847690 | 8/1952 | Germany | 417/354 |
| WO9010161 | 9/1990 | WIPO . | |

*Primary Examiner*—Teresa Walberg
*Assistant Examiner*—Vinod D. Patel
*Attorney, Agent, or Firm*—Christie, Parker & Hale, LLP

[57] ABSTRACT

A hydrostatic servo positioning system and hydrostatic thrust bearing for an integral motor/generator and pump/turbine provides recirculating seal liquid through the positioning system and bearings to permit minimal seal liquid flow. In an integral motor/generator and pump/turbine with a stator having windings integral with a casing, a rotor mounted for rotation on a fixed axial shaft within the stator, the rotor being integral with an impeller for liquid flow, the servo positioning system and thrust bearings comprise a passageway through the fixed shaft for seal liquid, a radial liquid duct in the rotor extending from the fixed axial shaft to a port opening in a peripheral surface of the rotor, the radial liquid duct having liquid connection to the passageway through the axial shaft to pressurize seal liquid centrifugally when the rotor rotates in the stator. First and second annular gaps between the peripheral surface of the rotor and the casing extend from both sides of the port opening into first and second thrust chambers between rotor thrust surfaces and the casing. First and second return orifices from the first and second thrust chambers lead to the radial liquid duct to provide first and second servo liquid flow loops.

11 Claims, 1 Drawing Sheet

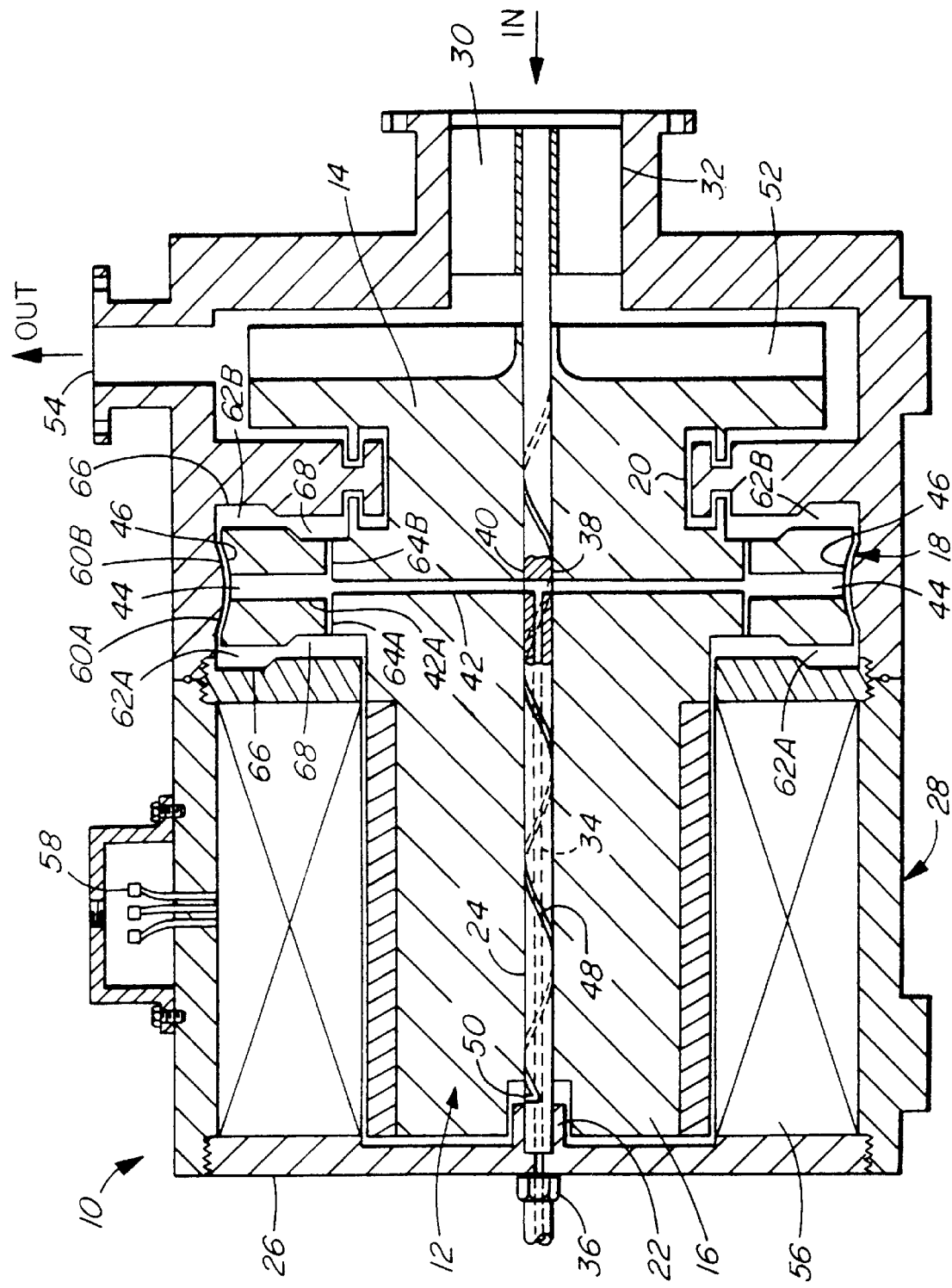

INTEGRAL MOTOR/GENERATOR AND PUMP/TURBINE WITH HYDROSTATIC BEARINGS

BACKGROUND OF THE INVENTION

The present invention relates to integral fluid pumps and electric motors and integral fluid turbines and electrical generators. Throughout the specification these are defined as integral motor/generators and pump/turbines. More specifically, the present invention relates to hydrostatic servo positioning system and thrust bearings that stabilize the actual position of a rotor in a stator of an integral motor/generator and pump/turbine.

In my U.S. Pat. No. 5,209,650 entitled Integral Motor and Pump, I disclosed integral motors/generators and pump/turbines with a hydrostatic servo positioning system and hydrostatic thrust bearings. As disclosed in my previous patent, seal liquid is introduced through a fixed axial shaft to hydrostatic servo positioning system and thrust bearings and then exits through mechanical seals. The seal liquid is pressurized using centrifugal force caused by the rotor rotating within the stator casing. Because the unit is integral, external mechanical seals and stuffing boxes are not needed.

As internal mechanical seals are made more efficient, less seal liquid passes through them, thus there is less liquid available for the servo control of the positioning system and the hydrostatic thrust bearings. In my earlier patent, U.S. Pat. No. 5,209,650, all the seal liquid followed a series path which passed through the servo annular ring gap, through the thrust bearing chambers and through the internal seals on either side of the rotor. However, if the seal liquid flow is reduced, there is less liquid for the servo control of the hydrostatic thrust bearings, thus the servo annular ring gaps have to be reduced. The limit of reduction of the servo annular ring gaps is the tolerance of the axial bearing formed by the rotor and the fixed shaft, after which the rotor will contact the stator.

In order to overcome this problem, I have discovered that the seal flow liquid through the servo annular gaps can be increased by recirculating the seal liquid through the servo annular gaps. This increase flow through the servo annular gaps facilitates pressure attenuation of the seal liquid flow across the annular servo gap at larger gap spacings. Hence the servo system can operate at larger clearances and avoid contact between the stationary and rotating parts.

As in my previous patent, the servo mechanism varies the flow of seal liquid between two thrust bearings to take into account changes in axial thrust on one end of the rotor to stabilize the rotor within the stator.

SUMMARY OF THE INVENTION

The present invention provides in one embodiment an integral motor/generator and pump/turbine comprising:

(a) a stator having windings therein integral with a casing;

(b) a rotor mounted for rotation on a fixed axial shaft within the stator, the rotor being integral with an impeller for liquid flow;

(c) a passageway through the fixed axial shaft for supplying seal liquid;

(d) at least one radial liquid duct in the rotor extending radially from the fixed axial shaft to a port opening in a peripheral surface of the rotor, the radial liquid duct having liquid connection to the passageway through the fixed axial shaft to pressurize seal liquid centrifugally when the rotor rotates within the stator;

(e) a first annular gap between the peripheral surface of the rotor and the casing extending on one side of the port opening;

(f) a second annular gap between the peripheral surface of the rotor and the casing extending on the other side of the port opening;

(g) a hydrostatic first thrust bearing supplied with seal liquid from the first annular gap;

(h) a hydrostatic second thrust bearing supplied with seal liquid from the second annular gap;

(i) a first circulating orifice from the first thrust bearing to the radial liquid duct in the rotor to recirculate seal liquid in a first servo liquid flow loop; and (j) a second circulating orifice from the second thrust bearing to the radial liquid duct in the rotor to recirculate seal liquid in a second servo liquid flow loop.

In yet a further embodiment, there is provided in an integral motor/generator and pump/turbine having a rotor with an integral impeller for liquid flow mounted for rotation on a fixed axial shaft in a casing of a stator, the integral motor/generator and pump/turbine having at least two hydrostatic thrust bearings supplied with seal liquid under pressure, a method of stabilizing the rotor relative to the casing comprising the steps of:

(a) feeding seal liquid through at least one radial liquid duct in the rotor to a port opening in a. peripheral surface of the rotor to pressurize the seal liquid centrifugally when the rotor rotates in the casing of the stator and providing servo positioning of the rotor in the casing;

(b) passing seal liquid through a first servo annular gap on one side of the port opening into a first thrust chamber;

(c) passing seal liquid through a second servo annular gap on the other side of the opening to a second thrust chamber;

(d) recirculating the seal liquid from the first thrust chamber and the second thrust chamber through return orifices to the radial liquid duct to increase seal liquid flow through the first servo annular gap to the first thrust chamber and through the second annular gap to the second thrust chamber to stabilize the rotor relative to the casing, and (e) allowing a minimal flow of the seal liquid from the first thrust chamber and the second thrust chamber to pass through mechanical seals on ends of the rotor.

BRIEF DESCRIPTION OF THE DRAWING

In a drawing which illustrates an embodiment of the invention, a longitudinal sectional view shows one embodiment of an integral motor/generator and pump/turbine with hydrostatic servo positioning system and thrust bearings.

DETAILED DESCRIPTION

The integral motor/generator and pump/turbine may be an electric motor and pump with an impeller, the impeller having an axial liquid entry, or it may be a single stage of a multiple stage pump. In another embodiment, the unit may be a liquid turbine and electric generator with an axial liquid entry. The pump may be a mixed flow pump having both axial and radial liquid movements, a radial flow pump, an axial flow pump or any other suitable type of pump having an integral rotor and impeller. Similarly, the generator may be of different kinds, but in each case will have an integral rotor and impeller.

The figure shows an integral motor/generator and pump/turbine 10 that has a rotor assembly 12 with an impeller 14 integral with a rotor 16, a servo positioning system and a hydrostatic thrust bearing assembly 18 and a mechanical seal 20 between the impeller 14 and the hydrostatic thrust bearing assembly 18. A second internal mechanical axial seal 22 is provided at the rotor end of the rotor assembly 12. The rotor 16 is mounted on a fixed axial shaft 24 which is supported at a rotor end by an end plate 26 of a casing assembly 28 and an impeller end by fixed vanes 30 positioned in an axial liquid entry 32 to the pump/turbine. The fixed shaft 24 has a seal liquid passageway 34 which extends from a seal liquid inlet 36 on the end plate 26 to a radial orifice 38 in the shaft 24 positioned to connect to a circumferential groove 40 located to match radial liquid ducts 42 extending to port openings 44 in the peripheral surface 46 of the rotor 16 at the servo positioning system and hydrostatic thrust bearing assembly 18. There is also provided a helical groove 48 in the fixed shaft 24 which is connected by a second radial orifice 50 in the fixed shaft 24. This helical groove 48 provides seal liquid between the rotor 16 and the fixed shaft 24 to form a hydrostatic radial bearing.

Pump flow or generator flow occurs through inlet 32 of the casing assembly 28. Impeller blades 52 attached to the impeller 14 are either rotated by the motor in the case of a pump, or rotate the generator, in the case of a turbine, by the action of the liquid entering the entry 32 passing through the impeller and exiting from outlet 54 shown in this embodiment as being tangential to the impeller 14. In other embodiments the outlet may extend axially. Examples of other types of motor/generators and pump/turbines are shown in my U.S. Pat. No. 5,209,650. Electrical windings 56 connected to leads 58 either provide power to the pump, or in a generator produce power from the rotating impeller 14.

The servo positioning system and hydrostatic thrust bearing assembly 18 has annular gaps positioned between the peripheral surface 46 of the rotor and the casing assembly 28. As shown in the figure, there is a first annular gap 60A extending from the port openings 44 to a first thrust chamber 62A on the winding side of the assembly. A second annular gap 60B extends to a second thrust chamber 62B on the impeller side of the assembly. The annular gaps 60A and 60B are sloped outwards and away from the port opening 44, thus movement of the rotor assembly 12 within the casing assembly 28 increases the size of the annular gap on one side and reduces it on the other side. This change in gap size reduces the flow of seal liquid to either of the thrust chambers 62A and 62B thus provides a servo positioning system to stabilize the position of the rotor 12 relative to the casing assembly 28.

First return orifices 64A extend from the lower portion of the first thrust chamber 62A to the radial liquid ducts 42 and second return orifices 64B extend from the second thrust chamber 62B to the radial liquid ducts 42. These orifices 64A and 64B are substantially in line. A minimal flow of seal liquid from the first thrust chamber 62A flows along the surface of the rotor 16 beneath the casing under the windings 56 to the second internal seal 22 and recirculating seal liquid passes through the first return orifices 64A to the radial liquid ducts 42 thus forming a recirculating servo liquid flow loop. Similarly, a minimal flow of seal liquid in the second thrust chamber 62B flows through the mechanical seal 20 and recirculating seal liquid passes through the second return orifices 64B to the radial liquid duct 42 thus forming a second recirculating servo liquid flow loop.

In effect, seal liquid passing through the radial liquid ducts 42 is centrifugally pressurized as it extends out to the periphery of the thrust bearing assembly 18 so it is under increased pressure in the first annular gap 60A. and second annular gap 60B forming the servo positioning system and passes into the thrust chambers 62A and 62B. From these thrust chambers, recirculating seal liquid passes back again through the return orifices 64A and 64B where it rejoins the existing seal liquid and is repressured to ensure that it recirculates. The pressure drop across the first and second annular gap 60A and 60B is a function of the flow, thickness of annular gap and length of annular gap. Stationary flutes 66 are shown in both the first thrust chamber 62A and the second thrust chamber 62B attached to the casing, these stationary flutes are positioned in outer portions of the thrust chambers 62A and 62B and provide distribution of seal liquid as it exits the annular gaps 60A and 60B. Whereas the figure shows radial liquid ducts 42 extending in line radially from the fixed shaft 48, a single radial liquid duct or multiple radial liquid ducts may be provided dependent upon the required liquid flow.

Rotating flutes 68 attached to the rotor are positioned on the inward portion of the thrust chambers 62A and 62B these in one embodiment, improve the introduction of seal liquid into the return orifices 64A and 64B.

As shown in the figure, the radial liquid duct portions 42A between the return orifices 64A and 64B and the port openings 44 have a larger cross sectional area than the remaining part of the radial liquid ducts 42 extending to the fixed axial shaft 24. This assists in increasing seal liquid flow to the port openings 44.

The high flow recirculating servo liquid flow loops between the thrust chambers 62A and 62B and the radial liquid duct 42 provide additional liquid to the annular gaps 60A and 60B and thus the servo positioning system.

Whereas the figure shows one embodiment of an integral motor/generator and pump/turbine, it will be apparent to those skilled in the art that the arrangement may be applied to any of the types of integral motor/generator and pump/turbines shown in U.S. Pat. No. 5,209,650.

Various changes may be made to the embodiment shown herein without departing from the scope of the present invention which is limited only by the following claims.

I claim:

1. An integral motor/generator and pump/turbine comprising:

(a) a stator having windings therein integral with a casing;

(b) a rotor mounted for rotation on a fixed axial shaft within the stator, the rotor being integral with an impeller for liquid flow;

(c) a passageway through the fixed axial shaft for supplying seal liquid;

(d) at least one radial liquid duct in the rotor extending radially from the fixed axial shaft to a port opening in a peripheral surface of the rotor, the radial liquid duct having liquid connection to the passageway through the fixed axial shaft to pressurize seal liquid centrifugally when the rotor rotates within the stator;

(e) a first annular gap between the peripheral surface of the rotor and the casing extending on one side of the port opening;

(f) a second annular gap between the peripheral surface of the rotor and the casing extending on the other side of the port opening;

(g) a first thrust chamber extending inwardly from the first annular gap between a first rotor thrust surface and the casing;

(h) a second thrust chamber extending inwardly from the second annular gap between a second rotor thrust surface and the casing;

(i) a first return orifice from the first thrust chamber leading to the radial liquid duct in the rotor to provide a first servo liquid flow loop; and (j) a second return orifice from the second thrust chamber leading to the radial liquid duct in the rotor to provide a second servo liquid flow loop.

2. The integral motor/generator and pump/turbine according to claim 1 wherein the rotor moves axially relative to the casing from an increased axial thrust on the rotor, the axial movement of the rotor increases the first annular gap or the second annular gap and decreases the other annular gap to change seal liquid flows and pressures to the first thrust chamber and the second thrust chamber, thus stabilizing the axial position of the rotor relative to the stator.

3. The integral motor/generator and pump/turbine according to claim 2 wherein the first annular gap and the second annular gap are sloped in opposite directions from the port opening.

4. The integral motor/generator and pump/turbine according to claim 1 wherein stationary flutes are attached to the casing in outer portions of the first thrust chamber and the second thrust chamber to restrict concentric circulation of seal liquid passing inwards from the first annular gap and the second annular gap.

5. The integral motor/generator and pump/turbine according to claim 4 wherein rotating flutes are attached at inward portions of the first rotor thrust surface and the second rotor thrust surface positioned inwards from the stationary flutes, the rotating flutes commence concentric rotation of the seal liquid prior to entering the first and second return orifices leading to the first and second servo liquid flow loops.

6. The integral motor/generator and pump/turbine according to claim 1 wherein the radial liquid duct in the rotor from the first return orifice and the second return orifice to the port opening in the peripheral surface of the rotor has a larger cross-sectional area than the radial liquid duct extending between the fixed axial shaft to the first return orifice and the second return orifice.

7. An integral motor/generator and pump/turbine comprising:

(a) a stator having windings therein integral with a casing;

(b) a rotor mounted for rotation on a fixed axial shaft within the stator, the rotor being integral with an impeller for liquid flow;

(c) a passageway through the fixed axial shaft for supplying seal liquid;

(d) at least one radial liquid duct in the rotor extending radially from the fixed axial shaft to a port opening in a peripheral surface of the rotor, the radial liquid duct having liquid connection to the passageway through the fixed axial shaft to pressurize seal liquid centrifugally when the rotor rotates within the stator;

(e) a first annular gap between the peripheral surface of the rotor and the casing extending on one side of the port opening;

(f) a second annular gap between the peripheral surface of the rotor and the casing extending on the other side of the port opening;

(g) a hydrostatic first thrust bearing supplied with seal liquid from the first annular gap;

(h) a hydrostatic second thrust bearing supplied with seal liquid from the second annular gap;

(i) a first circulating orifice from the first thrust bearing to the radial liquid duct in the rotor to recirculate seal liquid in a first servo liquid flow loop; and (j) a second circulating orifice from the second thrust bearing to the radial liquid duct in the rotor to recirculate seal liquid in a servo second liquid flow loop.

8. The integral motor/generator and pump/turbine according to claim 7 wherein an increased axial thrust on the rotor increases the seal liquid supply to either the first thrust bearing or the second thrust bearing to counter the axial thrust and reduce the seal liquid supply to the other thrust bearing to stabilize the axial position of the rotor relative to the casing.

9. In an integral motor/generator and pump/turbine having a rotor with an integral impeller for liquid flow mounted for rotation in a casing of a stator, the integral motor/generator and pump/turbine having at least two hydrostatic thrust bearings supplied with seal liquid under pressure, a method of stabilizing the rotor relative to the casing comprising the steps of:

(a) feeding seal liquid through at least one radial liquid duct in the rotor to a port opening in a peripheral surface of the rotor to pressurize the seal liquid centrifugally when the rotor rotates in the casing of the stator and providing servo positioning of the rotor in the casing;

(b) passing seal liquid through a first servo annular gap on one side of the port opening into a first thrust chamber;

(c) passing seal liquid through a second servo annular gap on the other side of the port opening to a second thrust chamber;

(d) recirculating the seal liquid from the first thrust chamber and the second thrust chamber through return orifices to the radial liquid duct to increase seal liquid flow through the first servo annular gap to the first thrust chamber and through the second servo annular gap to the second thrust chamber, and stabilize the rotor relative to the casing, and (e) allowing a minimal flow of the seal liquid from the first thrust chamber and the second thrust chamber to pass through mechanical seals on ends of the rotor.

10. The method of stabilizing the rotor in an integral motor/generator and pump/turbine according to claim 9 including the step of varying the seal liquid flow on the one side and the other side of the port opening through the first annular gap into the first thrust chamber and through the second annular gap into the second thrust chamber in accordance with increased axial thrust on one end of the rotor to stabilize the rotor relative to the casing.

11. The method of stabilizing the rotor in an integral motor/generator and pump/turbine according to claim 10 wherein the step of varying the seal liquid flow occurs by moving the rotor relative to the casing in accordance with increased axial thrust, to increase seal liquid flow through either the first annular gap or the second annular gap.

\* \* \* \* \*